UNITED STATES PATENT OFFICE.

F. W. ARMSTRONG, OF NEW YORK, N. Y., ASSIGNOR TO HIMSELF AND S. G. MILLIGAN AND J. S. GREEN, JR., OF ELIZABETH, N. J.

IMPROVED COMPOSITION FOR JOURNAL-BOXES.

Specification forming part of Letters Patent No. 35,409, dated May 27, 1862.

*To all whom it may concern:*

Be it known that I, FREDERICK W. ARMSTRONG, of the city, county, and State of New York, have invented a new and useful Composition for the Journal-Boxes of Car-Axles and the Shafting of Machinery; and I do hereby declare that the following is a full, clear, and exact description of the ingredients of the same and the method of compounding or mixing them in proper proportion.

The principal ingredient is wool-flock. The shearing of woolen cloth may be used, such as can be obtained from the various woolen-cloth manufactories at a trifling cost. This flock constitutes two-thirds of the composition by measurement or bulk. To the flock I add a concentrated solution of alum—that is to say, alum is dissolved in water to the point of saturation and the water mixed with the flock—the alum-water forming the one thirty-second part of the bulk of the composition. Gum or mucilage of any kind is then added, the latter being in quantity the one thirty-second part of the bulk of the composition. The balance is made up of calcined plaster-of-paris, or plumbago, soapstone, or the sulphate of alumina will answer. The flock serves as an excellent medium to hold or bind the other ingredients together without forming a heavy compact mass, while the alum serves as a non-conductor of heat, and, in connection with the flock, has a tendency to prevent heating. The mucilage or gum serves to agglutinate the several parts together to form a perfect union, while the plaster-of-paris, plumbago, soapstone, or sulphate of alumina give a certain degree of "body" or consistency to the composition, and at the same time, on account of their greasy or anti-friction tendency, together with a non-conducting property, the heating of the journal and bearing is prevented. The latter-named articles—to wit, plaster-of-paris, plumbago, soapstone, and sulphate of alumina—are of the same nature or possess the same quality so far as anti-attrition is concerned, and consequently all or any one of them may be used for the purpose with the same result.

Having thus described my invention, what I claim as new, and desire to secure by Letters Patent, is—

The wool-flock, concentrated solution of alum, gum or mucilage, and plaster-of-paris, or the equivalent substances herein named, when combined substantially in the proportion and for the purpose specified.

F. W. ARMSTRONG.

Witnesses:
  M. M. DOMPTON,
  C. W. COWTAN.